Patented July 7, 1942

2,288,971

UNITED STATES PATENT OFFICE 2,288,971

COLORLESS MOTHPROOFING TRIAZINE CONDENSATION PRODUCTS

Henry Martin, Basel, and Hans Heinrich Zaeslin, Riehen, near Basel, Switzerland, assignors to J. R. Geigy A. G., Basel, Switzerland, a firm No Drawing. Application May 25, 1940, Serial No. 337,314. In Switzerland May 17, 1939

4 Claims. (Cl. 260—248)

The specification of our patent application Ser. No. 269,216, filed April 21, 1939, describes a process whereby a large number of colorless condensation products can be prepared by condensing 1 mol. of a cyanuric halide with 1 mol. or with 2 or 3 mol. of the same or in part different compounds of the benzene series containing reactive hydrogen, the reaction components being so selected that the final product contains at least one halogen atom and a sulphonic acid group, but contains no auxochrome groups or substituents which impart color to the condensation product. The specification also describes a process for making colorless condensation products containing halogen and at least one sulphonic acid group by treating with a halogenating agent according to the usual methods a colorless condensation product which is free from halogen or is not too highly halogenated and contains at least one sulphonic acid group and is obtained from a cyanuric halide and a compound containing reactive hydrogen.

The products obtainable according to the aforesaid specification are excellently suited for treating wool, furs, feathers and the like according to methods usual for acid dyeing in order to impart to them a protection against damage by moths which is fast to light, washing and fulling.

The present invention is an improvement in or modification of that described in the aforesaid specification and is based on the surprising discovery that some colorless condensation products of the cyanuric series which are free from halogen are also effective agents for protection against moths. Such colorless condensation products are obtained in accordance with the invention by causing a cyanuric halide to react with 1 mol. or in any desired order with more than 1 mol. of the same or different compounds of the general formula:

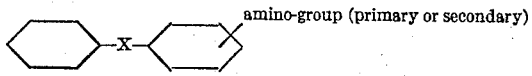
amino-group (primary or secondary)

which are free from halogen and contain a reactive hydrogen atom, X in the above formula standing for a bivalent atom or a bivalent atomic grouping such as O, S, $CH_2$, SO or $SO_2$, the compound or at least one of the compounds used containing a sulphonic acid group; the phenyl nuclei free from halogen in the compound or compounds used may be substituted as desired, especially by alkyl groups, whereby in the case of aminodiphenyl ether a methyl group, insofar as it is present alone, is best located in a para-position to X. Any halogen atoms of the cyanuric halide which have not been replaced are exchanged by reaction with ammonia, a primary or secondary amine or with an agent which provides a hydroxyl, alkoxyl or phenoxyl group in any desired selection and order of succession.

The following compounds may be named as examples of aminosulphonic acids or amines containing reactive hydrogen in accordance with the above definition: 4- methyl -2'- amino -1:1'- diphenyl - ether-(4'-sulphonic acid), 4- methyl-4'- amino -1:1'- diphenylether -(2'-sulphonic acid), 2'-amino-1:1'-diphenylether-(2'- or 4'-sulphonic acid), 3:4 - dimethyl -4'- amino -1:1'- diphenyl- ether-(2'-sulphonic acid), 4-methyl- or 3:4-dimethyl - 2' - amino -1:1'- diphenylsulphide-(4'- sulphonic acid), 4-methyl- or 3:4-dimethyl-2'- amino -1:1'- diphenylsulphoxide -(4'- sulphonic acid), 3:4-dimethyl -4'- amino-1:1'-diphenylsulphone -2'- sulphonic acid, 4 - aminodiphenylsulphone, 4-aminodiphenylmethane and the like.

The condensation products may be made according to known general methods by causing the amine or aminosulphonic acid free from halogen to react with the cyanuric halide in the presence of an agent which binds hydrogen halide, such as an acetate or a carbonate. Any halogen atoms in the polyimide halide which have not been utilised in the reaction may be caused to react with ammonia, methylamine, allylamine, diethylamine, diallylamine, unsymmetrical diethylethylenediamine or with an alkali solution, an alcoholate such as a methylate or ethylate or with a phenolate or the like. This reaction may of course precede the reaction with the amines or aminosulphonic acids above defined.

Various compounds free from halogen and containing sulphonic acid groups have already been proposed as agents for protection against moths. There may be named for example hydroxytriarylmethanes containing sulphonic acid groups prepared by condensation of para-alkylated phenols with aldehyde sulphonic acids or the like. These products have only small fastness to light and they are fast neither to fulling nor to washing. Condensation products free groups from alkylated phenols and derivatives of isatin do not provide a protection of the strength of that of the condensation products free from halogen of the present invention. Condensation products from aldehyde sulphonic acids and mercaptans in part free from halogen have also been recommended as agents for protection against moths. As is apparent from the following table none of the aforesaid compounds attains the valuable properties of the condensation products free from halogen obtained from cyanuric halides and aminosulphonic acids free from halogen.

Prescription for use

The compounds are applied to woolen materials in an acid bath in the same manner as acid dyestuffs and the material is then exposed to the larvae of moths. The percentages are calculated on the treated materials.

TABLE

| Compound | Material treated with 2 percent of the compound | | | Material treated with 6 percent of the compound | | |
|---|---|---|---|---|---|---|
| | Dried | Washed | Fulled | Dried | Washed | Fulled |
| No. 1 | − | − | − | − | − | − |
| No. 2 | + | − | − | + | + | − |
| No. 3 | + | − | − | + | + | − |
| No. 4 | + | − | − | + | + | − |
| No. 5 | + | + | − | + | + | + |
| No. 6 | + | + | − | + | + | + |
| No. 7 | + | + | + | + | + | + |

+ Means: protected.
− Means: insufficient protection against damage by moths.

*Compound No. 3*

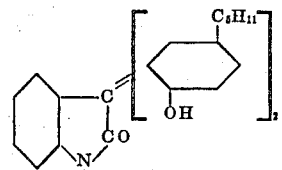

*Compound No. 4*

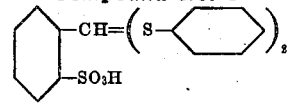

*Compound No. 5*

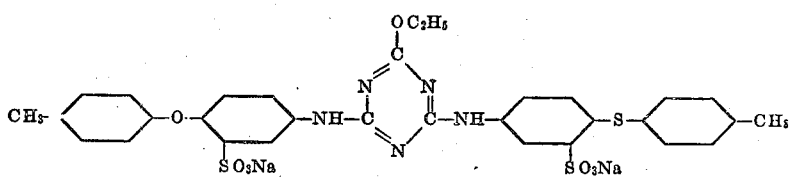

*Compound No. 6*

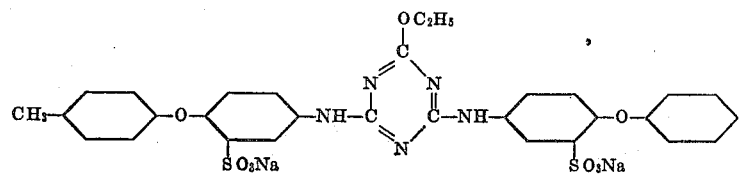

*Compound No. 7*

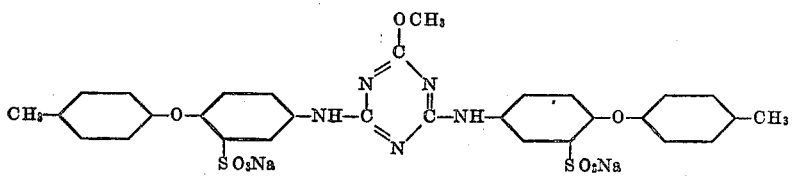

*Compound No. 1*

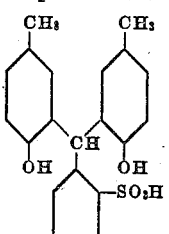

*Compound No. 2*

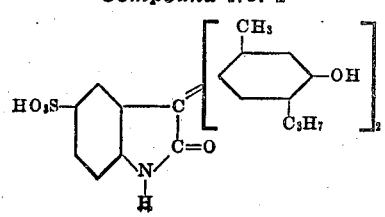

The following examples illustrate the invention, the parts being by weight:

*Example 1*

A solution of 1.15 parts of sodium in 100 parts of ethyl alcohol is allowed to run drop by drop at 0° C. and whilst well stirring into a suspension of 9.3 parts of finely divided cyanuric chloride, prepared for example by pouring a solution of cyanuric chloride in acetone into 200 parts of ice water. There is then added at 30–40° C. a solution of 15 parts of 4'-methyl-4-amino-1:1'-diphenyl-ether-2-sulphonic acid in 200 parts of water which has been neutralized with the required quantity of sodium carbonate and the whole is stirred until a sample no longer gives the diazo reaction with nitrite; the hydrochloric acid which is formed is neutralized continuously with sodium carbonate. At a temperature of 70–95° C. there is then added a solution of 14.8 parts of 4'-methyl-4-amino-1:1'-diphenyl-sulphide-2'-sulphonic acid in 200 parts of water which has previously been neutralized with sodium carbonate, and the acid liberated during the condensation is continuously neutralized. After 2 hours a sample no longer gives the diazo reaction with nitrite. The whole is cooled and the condensation product is salted out, filtered and dried under reduced pressure. It is a light powder which is freely soluble in water.

*Example 2*

A solution of 1.15 parts of sodium in 100 parts of ethyl alcohol is added by drops at 0° C. and whilst well stirring to 9.3 parts of finely divided cyanuric chloride prepared for example by pouring a solution of the body in acetone into 200 parts of ice water. At 30-40° C. is added a solution of 15 parts of 4'-methyl-4-amino-1:1'-diphenyl-ether-2-sulphonic acid in 200 parts of water and the necessary quantity of sodium carbonate and the whole is stirred until a sample no longer gives the diazo reaction with nitrite; the hydrochloric acid split off is continuously neutralized with sodium carbonate. The whole is heated to 85° C. and there is added a solution of 13.2 parts of 4-amino-1:1'-diphenyl-ether-2-sulphonic acid in 200 parts of water and the necessary quantity of sodium carbonate and the whole is maintained at 85-95° C. whilst stirring until a sample no longer gives the diazo reaction with nitrite. The reaction can likewise be conducted by neutralisation of the liberated hydrochloric acid with sodium carbonate. Finally the whole is cooled and the condensation product is salted out with common salt solution.

*Example 3*

To 9.3 parts of cyanuric chloride which has been brought into finely divided form as described in Example 1 is added by drops at 0° C. and whilst well stirring a solution of 1.15 parts of sodium in 100 parts of methanol (or ethanol). There is then added at 30-40° C. a solution of 15 parts of 4' - methyl - 4 - amino - 1:1' - diphenyl-ether-2-sulphonic acid in 200 parts of water and the necessary quantity of sodium carbonate and the whole is stirred until examination of a sample shows that the reaction is completed; the liberated acid is continuously neutralized with sodium carbonate. The whole is heated to 85-95° C. and at this temperature there is added by drops a solution of the same quantity of the above ether-sulphonic acid or the corresponding compound free from sulphonic acid groups or any of the other amines or amino-sulphonic acids above enumerated and the whole is heated to boiling for 2 hours, the liberated acid being continuously neutralized with sodium carbonate. After the reaction mixture has cooled, the condensation product is salted out with common salt solution, filtered and dried under reduced pressure.

What we claim is:

1. Colorless condensation products having the following general formula:

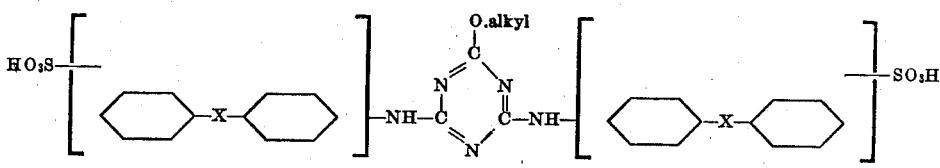

wherein X means a member of the group consisting of O, S, CH₂, SO, SO₂, the four benzene nuclei being substituted by substituents selected from the group consisting of H and alkyl groups, said products being adapted as moth-proofing agents.

2. A colorless condensation product having the following formula:

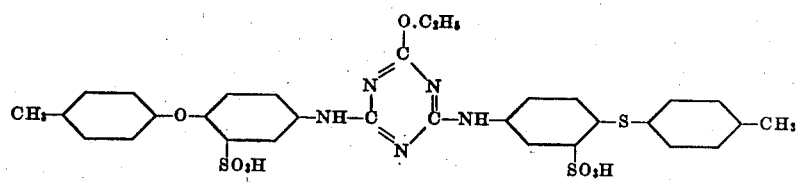

adapted as moth-proofing agent.

3. A colorless condensation product having the following formula:

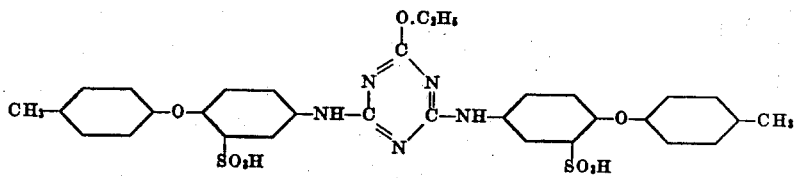

adapted as moth-proofing agent.

4. A colorless condensation product having the following formula:

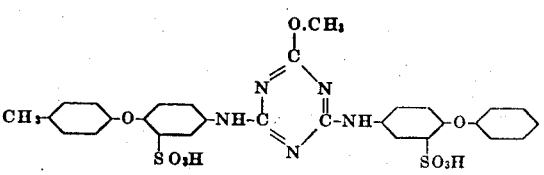

adapted as moth-proofing agent.

HENRY MARTIN.
HANS HEINRICH ZAESLIN.